INVENTOR
HARVEY J. UNDERHILL
By Emery L. Groff
Atty

Jan. 3, 1967   H. J. UNDERHILL   3,295,819
VALVE CONSTRUCTION
Filed May 11, 1964   3 Sheets-Sheet 2

INVENTOR
HARVEY J. UNDERHILL
BY Emery L. Groff Jr. ATY

Jan. 3, 1967  H. J. UNDERHILL  3,295,819
VALVE CONSTRUCTION

Filed May 11, 1964  3 Sheets-Sheet 3

INVENTOR
HARVEY J. UNDERHILL
By Emery C. Groff, Atty

United States Patent Office 3,295,819
Patented Jan. 3, 1967

3,295,819
VALVE CONSTRUCTION
Harvey John Underhill, Pembroke, Ontario, Canada, assignor to Atomic Energy of Canada Limited, Ontario, Canada, a corporation
Filed May 11, 1964, Ser. No. 366,539
8 Claims. (Cl. 251—69)

This invention relates to improvements in valve mechanisms, and relates to a valve construction that is especially suitable for use as a "dump valve" in a nuclear reactor of the type employing a liquid (heavy water) moderator.

In the event of an emergency in the reactor, it is important to ensure dumping of the moderator from the reactor vessel into a storage vessel as quickly as possible. It is vital that the mechanism employed to effect this dumping action be completely reliable and that it should have fail safe characteristics.

More specifically, a valve to be used as a dump valve in a nuclear reactor has certain requirements. Firstly, it should have a large throat diameter to permit a large volume flow of liquid for rapid dumping. This large diameter must not, however, be combined with sluggishness. The valve must have the ability to be moved from the closed position to the fully open position in a very short time (for example, a time of the order of half a second). When closed, the valve should be relatively drip tight, and, in its closed condition, it must be able to support an operating head up to a value typically of approximately twenty feet of heavy water, at temperatures of the order of 200° F. Lastly, and most importantly, the valve must be fail safe, in that the moderator will be automatically dumped in the event of any failure of the control or power system.

The object of the present invention is to provide a valve construction having these operating characteristics. Although the valve construction of the present invention is for this reason suited to use in a nuclear reactor, it will be apparent that these characteristics are generally desirable ones, and that the valve construction will have other industrial applications.

One example of a valve constructed in accordance with the present invention is illustrated in the accompanying drawings. It is to be understood that this valve is shown by way of example only, the broad scope of the invention being defined in the appended claims.

Figure 1:
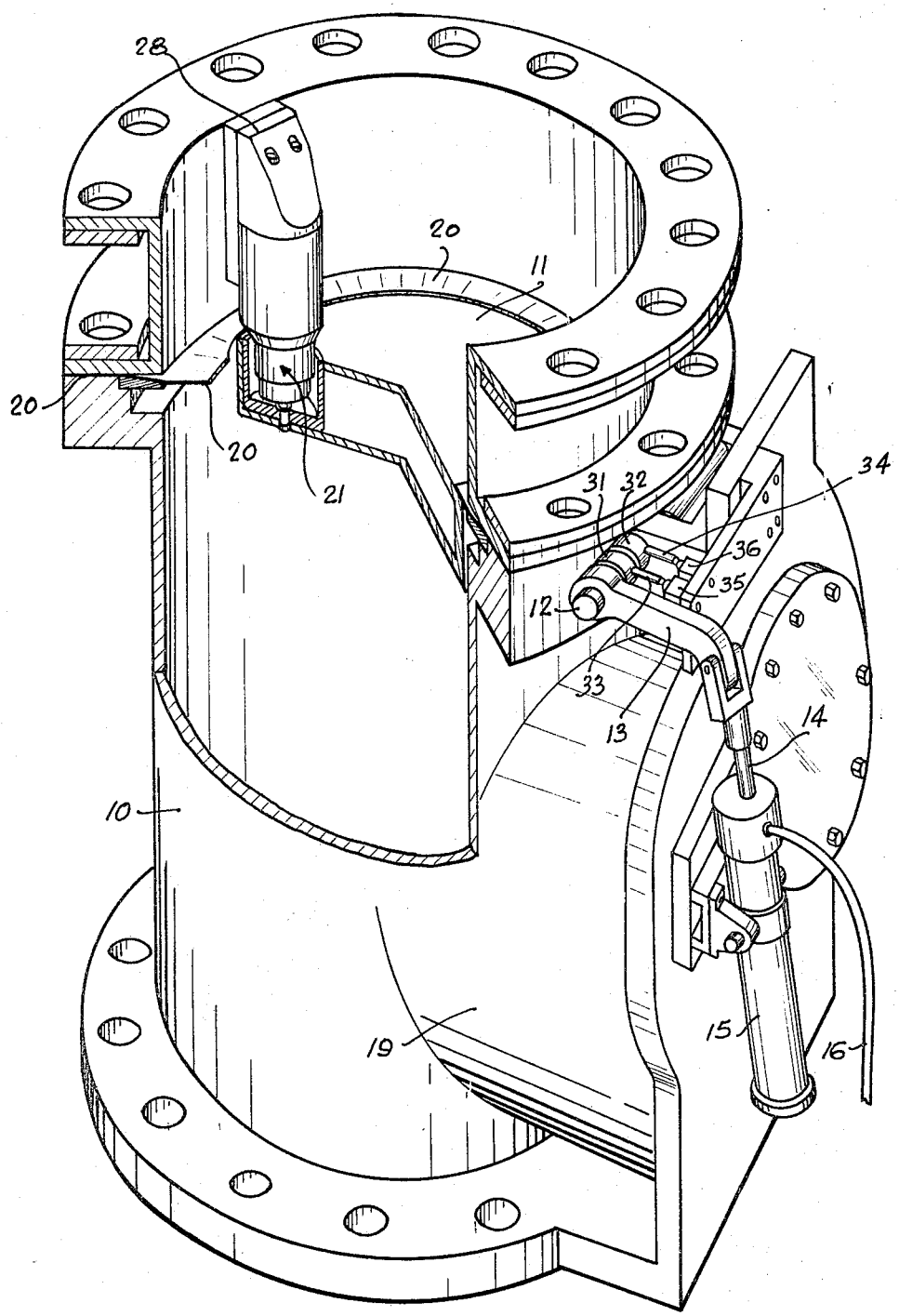
FIGURE 1 is a partly cut away perspective view of the overall valve construction.

The valve shown in FIGURE 1 includes a main casing 10 provided with appropriate perforated flanges for mounting the valve in the floor of a nuclear reactor vessel (not shown) or other apparatus that normally contains a volume of liquid that may require to be dumped rapidly under emergency conditions.

Figure 2:
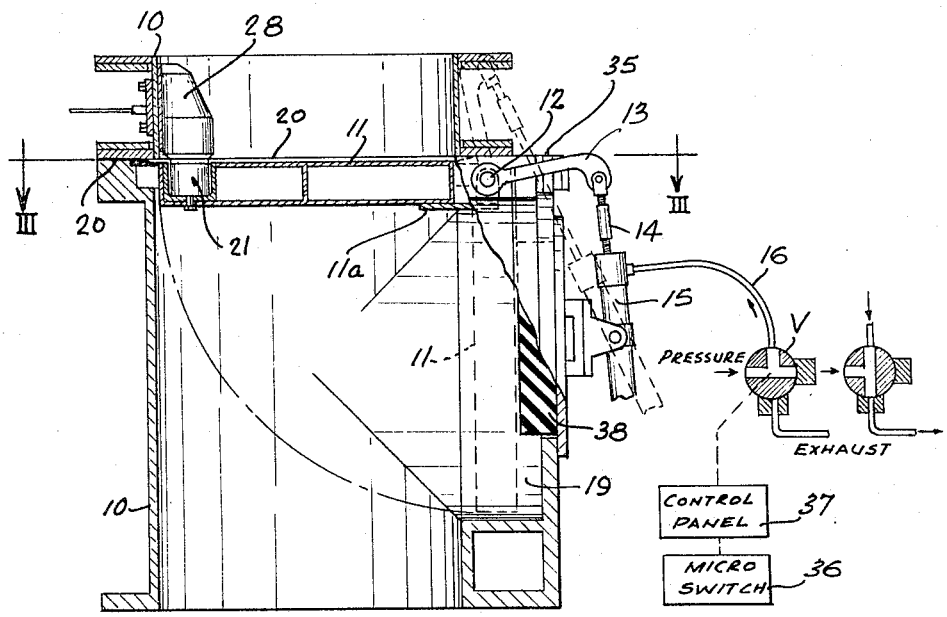
FIGURE 2 is a central vertical section through the valve showing certain ancillary parts.

The casing 10 is essentially cylindrical and defines a large diameter passageway across which a circular valve gate 11 extends transversely when the valve is closed, the position shown in the drawings. The gate 11 is mounted by means of a bracket 11a on a shaft 12, rotation of which causes the gate 11 to pivot between the closed position shown in FIGURE 1 and in full lines in FIGURE 2, and an open position shown in broken lines in FIGURE 2 in which the gate enters a lateral recess 19 in the casing 10 to leave the main passageway unobstructed.

An arm 13 is secured to one end of the shaft 12 and is acted upon by the piston rod 14 of a pneumatic or other fluid-pressure-operated cylinder 15 for closing the valve. Admission of air to the cylinder 15 through a conduit 16 withdraws the piston rod 14 to elevate the valve gate 11 to its closed position.

Figure 4:
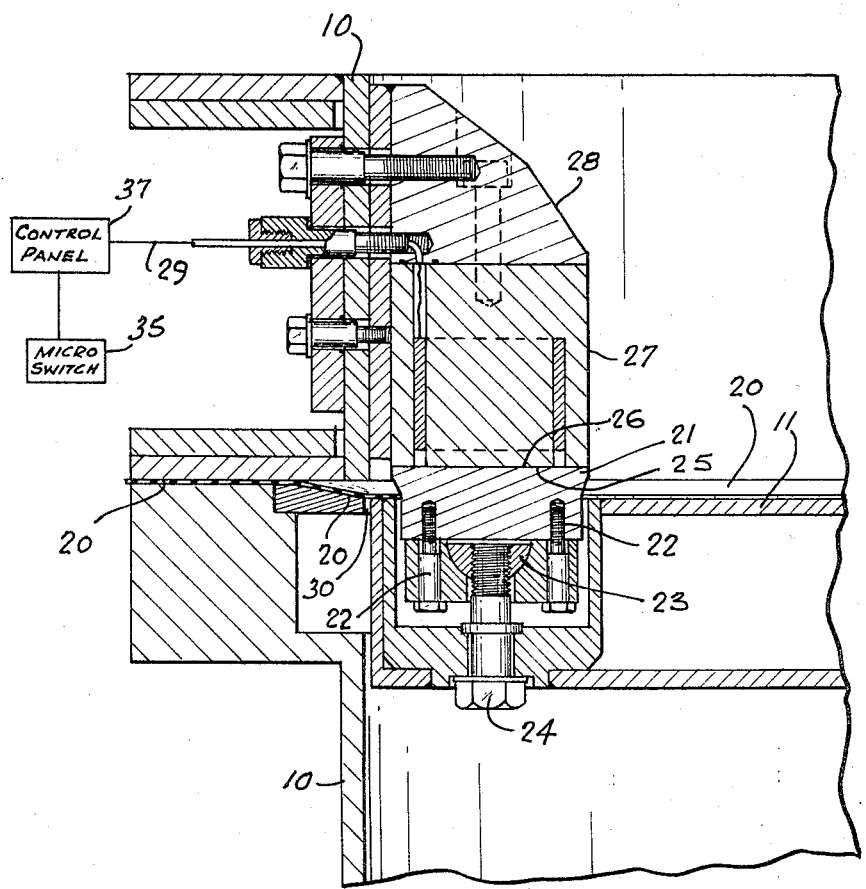
FIGURE 4 is an enlarged, fragmentary view of the top left-hand portion of FIGURE 2.

The circular valve gate 11 fits snugly within the bore of the casing 10 and, in the valve closed position, liquid leakage is substantially prevented by a neoprene or other flexible annular gasket 20 which projects radially from the casing 10 into its passageway to lie on the upstream side of the valve gate 11. In its periphery opposite the shaft 12, the valve gate 11 is formed with a cavity in which a magnet armature 21 is mounted by means of bolts 22 (FIGURE 4), part-spherical bearing 23 and bolt 24. This manner of mounting the armature 21 enables it to rock slightly to enable its flat outer face 25 to lie firmly against the outer face 26 of an electromagnet 27 which is secured in a housing 28 to the side wall of the casing 10 upstream of the gate 11. Power is supplied to the electromagnet 27 through a cable 29 (FIGURE 4).

When the valve gate 11 has been raised to its closed position by the cylinder 15, the armature and magnet surfaces 25 and 26 come to lie directly against one another and the valve gate is now held up directly by the magnetic forces extending between these surfaces. By using a ferro-cobalt alloy having a high magnetic permeability, it is possible to make the magnet 27 comparatively small while achieving the necessary force on the armature 21 to ensure that the valve gate is held closed against the pressure of a head of some 18 to 20 feet of heavy water. In this way the magnet is made to provide only a small impedance to liquid flow through the valve. As the vessel is filled with liquid, the hydraulic head tends to improve the liquid-tight properties of the seal by forcing the gasket 20 down tightly against the top surface of the valve gate 11.

To open the valve suddenly, the supply of electric power to the magnet 27 is interrupted, causing immediate release of the armature 21 in the valve gate 11. The construction is fail safe, because the valve gate 11 is held in the closed position by magnetic flux only. Valve opening must therefore follow automatically upon power failure. The gasket located solely upstream of the gate 11 is also a fail safe feature, since it offers no resistance to the valve opening process. In contradistinction to a seal that tightly engages the periphery of the valve gate and might therefore tend to inhibit movement of the gate, the gasket 20 only overlies the gate and cannot in any way check its downward movement. There is a sufficient gap 30 between the outer periphery of the gate 11 and the cylindrical wall of the casing 10 to ensure full freedom to the gate to move at all times. A rubber bumper pad 38 in the recess 19 absorbs the shock of the valve gate opening.

Figure 3:
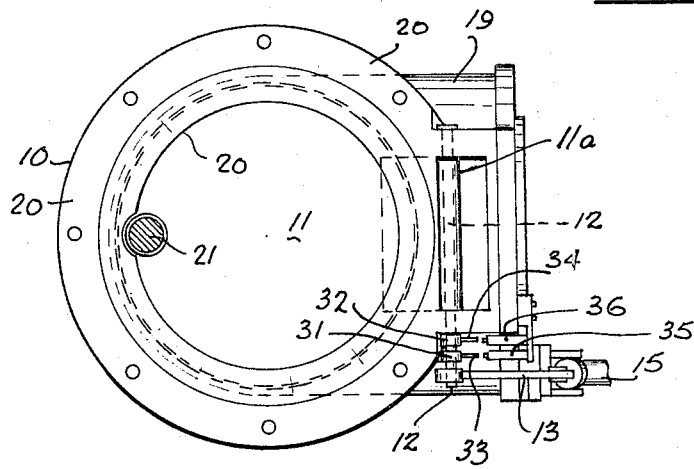
FIGURE 3 is a view on the line III—III in FIGURE 2.

As shown in FIGURES 1 and 3, the shaft 12 includes cams 31 and 32 acting respectively on arms 33 and 34 to operate micro switches 35 and 36 as soon as the shaft 12 has been turned sufficiently to bring the valve gate 11 up into its closed position. Micro switch 35 controls the electrical supply from a control panel 37 (FIGURE 4) to the magnet 27, and the micro switch 36 also actuates the control panel 37 (FIGURE 2) to operate a valve V to release pressure from the cylinder 15 when the valve gate 11 is closed, thus ensuring that the gate 11 is held in its closed position solely by the magnetic cooperation of the magnet 27 and the armature 21.

I claim:
1. A valve construction comprising
   (a) a casing defining a passageway,

(b) a valve gate and means mounting said valve gate in said passageway with said valve gate movable unimpededly from a position closing said passageway to a position opening said passageway, (c) a pair of cooperating magnet elements comprising an electromagnet and an armature, (d) means mounting one of said elements on said valve gate and the other of said elements on said casing with said elements in cooperating relationship in the closed position of the valve gate to hold the same in closed position, (e) means for moving said valve gate from open to closed position, (f) and means sensitive to location of said valve gate in said closed position for deactuating said moving means to leave said valve gate held in said closed position solely by said magnet elements.

2. A valve construction according to claim 1 including an annular gasket extending radially inwardly from the casing into the passageway to overlie the valve gate on the side thereof away from which said valve gate travels in moving from closed to open position.

3. A valve construction according to claim 1, including further means sensitive to location of said valve gate in said closed position for enabling energization of said electromagnet.

4. A valve construction comprising:
(a) a casing defining a passageway,
(b) a valve gate and means mounting said valve gate in said passageway with said valve gate unimpededly pivotable about an axis adjacent a side of said passageway from a relatively upstream position in which said valve gate extends across said passageway substantially to close the same to a relatively downstream position in which said valve gate is located to allow substantially unimpeded flow along said passageway,
(c) a pair of cooperating magnet elements comprising an electromagnet and an armature,
(d) means mounting one of said elements on said valve gate at a location remote from the pivotal axis thereof and the other of said elements on said casing within said passageway at a location to cooperate magnetically with the first element in the closed position of the valve gate to hold the same in closed position,
(e) means for moving said valve gate from open to closed position,
(f) and means sensitive to location of said valve gate in said closed position for deactuating said moving means to leave said valve gate held in said closed position solely by said magnet elements.

5. A valve construction according to claim 4 including an annular gasket extending radially inwardly from the casing into said passageway to overlie closely the upstream side of said valve gate.

6. A valve construction comprising:
(a) a casing defining a passageway,
(b) a valve gate and means mounting said valve gate in said passageway with said valve gate unimpededly pivotable about an axis adjacent a side of said passageway from a relatively upstream position in which said valve gate extends across said passageway substantially to close the same to a relatively downstream position in which said valve gate is located to allow substantially unimpeded flow along said passageway,
(c) an electromagnet mounted on said casing within said passageway on the upstream side of said valve gate,
(d) an armature for cooperation with said electromagnet and means mounting said armature on said valve gate,
(e) said electromagnet being mounted at a location to cooperate magnetically with said armature in the closed position of the valve gate to hold said valve gate in said closed position against pressure on the upstream side thereof,
(f) a seal comprising an annular gasket extending from said casing radially into said passageway to overlie closely said valve gate on the upstream side thereof,
(g) a fluid-pressure-operated cylinder for moving said valve gate from open to closed position,
(h) and means sensitive to location of said valve gate in said closed position for releasing pressure in said cylinder to leave said valve gate held in said closed position solely by the cooperation of said electromagnet and armature.

7. A valve construction according to claim 6, wherein said casing includes a lateral recess for receiving said valve gate in the open position thereof at a location withdrawn from said passageway.

8. A valve construction according to claim 6, including further means sensitive to location of said valve gate in said closed position for enabling energization of said electromagnet.

References Cited by the Examiner

UNITED STATES PATENTS

| | | | |
|---|---|---|---|
| 1,947,309 | 2/1934 | Rowley | 251—172 XR |
| 2,248,798 | 7/1941 | Wittmann | 251—65 |
| 2,469,831 | 5/1949 | Lewis | 251—69 XR |
| 2,502,118 | 3/1950 | Ashton et al. | 251—140 XR |
| 2,674,255 | 4/1954 | Biggle | 251—69 XR |
| 2,811,979 | 11/1957 | Presnell | 251—65 XR |
| 2,839,929 | 6/1958 | Hurlburt | 251—69 XR |
| 2,853,266 | 9/1958 | Raleigh | 251—172 |
| 3,035,810 | 5/1962 | Lowe et al. | 251—298 |

M. CARY NELSON, *Primary Examiner.*

SAMUEL SCOTT, *Assistant Examiner.*